United States Patent

Lee

[15] 3,695,541

[45] Oct. 3, 1972

[54] APPARATUS FOR THE RECEIVING, STORING AND RESTITUTION OF RECORDING TAPES

[72] Inventor: Elsie Chang Lee, Phoenix, Ariz.

[73] Assignee: Societe Industrielle Bull-General Electric (Societe anonyme), Paris, France

[22] Filed: March 18, 1970

[21] Appl. No.: 20,569

[52] U.S. Cl. ....................242/71.8, 242/67.3

[51] Int. Cl. ....................B65h 75/14, B65h 75/28

[58] Field of Search ..........242/67.1, 67.2, 67.3, 67.4, 242/71, 71.8, 71.9, 74, 74.1, 77

[56] References Cited

UNITED STATES PATENTS

| | | | |
|---|---|---|---|
| 3,064,917 | 11/1962 | Roberts et al. | 242/71.8 |
| 2,247,881 | 7/1941 | Hatfield | 242/71.8 |
| 3,092,349 | 6/1963 | Corsan | 242/74 |
| 3,312,409 | 4/1967 | Hurley | 242/67.1 |
| 2,574,883 | 11/1951 | Medal | 242/71.8 |
| 3,155,336 | 11/1964 | Uterhart | 242/71.8 |
| 3,334,402 | 8/1967 | Cuva | 242/71.8 X |
| 3,508,719 | 4/1970 | Browning | 242/71.8 |

*Primary Examiner*—Werner H. Schroeder
*Attorney*—Lewis P. Elbinger, Fred Jacob and Ronald T. Reiling

[57] ABSTRACT

A recording tape receiving, storing, and supplying device for use with a computer terminal having a tape punch and a tape reader, wherein a first tape storage reel is disposed to receive recorded tape emerging from either the punch or the reader, and a second tape storage reel is disposed to receive andinvert tape from the first reel and to supply recorded ed tape to the reader, andwherein each of these reels includes a hub for grasping one end of the tape stored thereon and a pair of flanges, each of the flanges consisting of a plurality of blades spaced apart around the periphery of the hub, the blades of one flange of each reel being provided with recesses to receive the tip of a finger for revolving the reel.

1 Claim, 10 Drawing Figures

INVENTOR
Elsie Chang Lee
BY
Lewis P. Elbinger
ATTORNEY

INVENTOR
Elsie Chang Lee

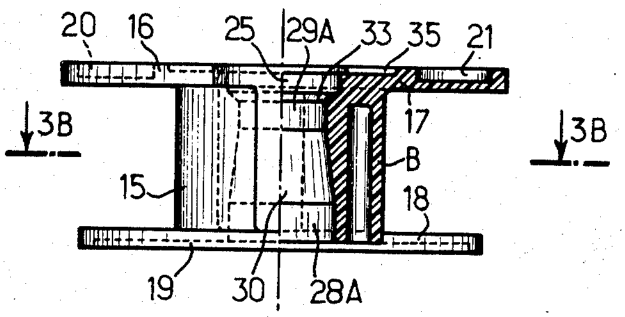
FIG.3A
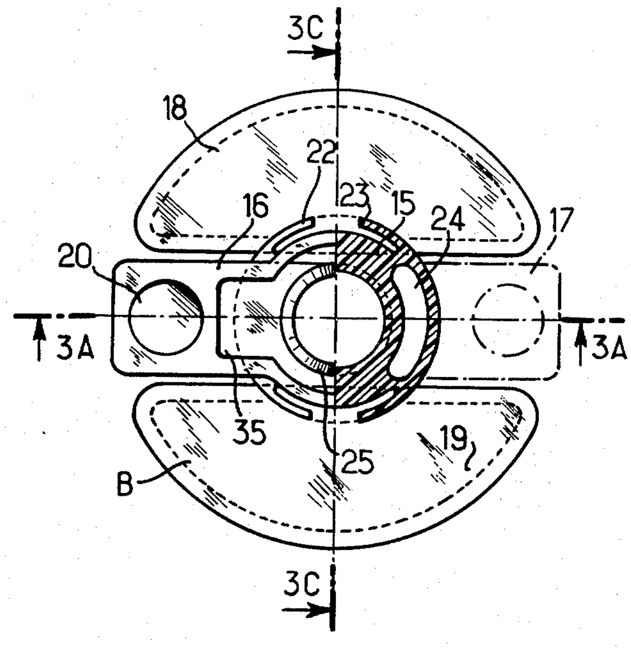
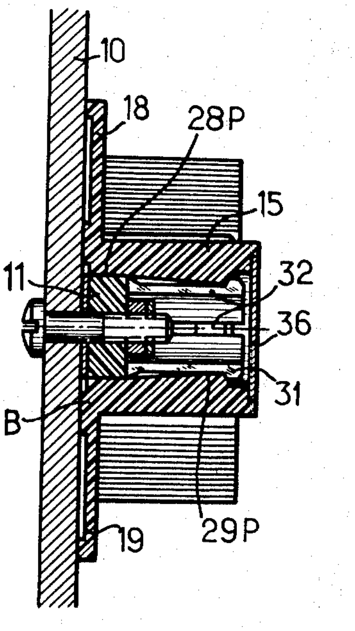
FIG.3B FIG.3C
INVENTOR
Elsie Chang Lee

INVENTOR
Elsie Chang Lee

INVENTOR
Elsie Chang Lee

APPARATUS FOR THE RECEIVING, STORING AND RESTITUTION OF RECORDING TAPES

BACKGROUND OF THE INVENTION

This invention relates to apparatus for the receiving, storing and restitution of recording tapes, such as punched tapes, magnetic tapes, films or the like, and relates, more particularly, to apparatus especially adapted for utilizing punched tapes of relatively short lengths with equipment performing the functions a teleprinter, transmitter-receiver, tape reader and perforator, which may constitute a terminal unit connected to a computer.

The manufacturers of terminal units generally have not judged it to be reasonable to furnish these machines with tape winding-unwinding mechanisms, although normally used in installations for the reception-transmission of telegraph traffic, because these mechanisms, with large tape capacity, are considered as too cumbersome and too costly to be utilized with equipment which is only intended to handle habitually tape recordings which at the most are a few meters or exceptionally, a few tens of meters. This is why, in installations linked to ultramodern computers, the punched tape is normally allowed to leave the terminal and spill upon the floor, where it becomes covered with dust and faces the risk of being trampled. Then the same tape is taken up again either for passing through a reader for transmission, where it loses a part of the dust with which it is covered, or else may be wound as it is, on the hand, under conditions which are very difficult and slow.

These tapes generally carry the recordings of information processing programs, data, or the results of calculations which can frequently be reused at a later time and should, because of this, be carefully marked and stored without the risk of deterioration of the tapes.

The object of the present invention is to remedy the above-stated disadvantages and to ameliorate the conditions of use of the tapes; it concerns apparatus especially adapted for satisfying all of these exigencies with very simple means and at an extremely low cost, which should permit a widespread adoption of this equipment for a more reasonable utilization and a better conservation of the tapes.

SUMMARY OF THE INVENTION

A machine for the handling of recording tapes, according to the invention, comprises a support adapted for receiving at least one reel for the reception, the storing, or the restitution of a recording tape. The reel comprises a hub adapted for being mounted on a support axle and provided with means for retaining one extremity of a tape which is wound on the hub. The reel is provided with two flanges for guiding and retaining the tape on the reel, a first flange being formed of several blades disposed in the same plane around one extremity of the hub, attached to it and mutually spaced apart by openings. A second flange is disposed at the other hub extremity and opposite the first flange and is similarly formed of spaced blades attached to the hub, each blade having substantially the form of an opening in the opposed flange and disposed opposite thereto. The different blades of one flange are each provided toward its extremity, and on the exterior face of the reel, with a driving cavity of circular form adapted for receiving the extremity of a finger or of an object of appropriate form for permitting the manual rotating of the reel in either sense around its axis.

BRIEF DESCRIPTION OF THE DRAWING

The invention will be described with reference to the accompanying drawing, wherein:

FIG. 3A is an elevational view of a reel, taken partially on the section 3A—3A of FIG. 3B;

FIG. 3B is a plan view of a reel, taken partially on the section 3B—3B of FIG. 3A;

FIG. 3C is an end view of a reel on a support axle and provided with a tape, taken on the section 3C—3C of FIG. 3B;

DESCRIPTION OF THE PREFERRED EMBODIMENT

Figure 1:
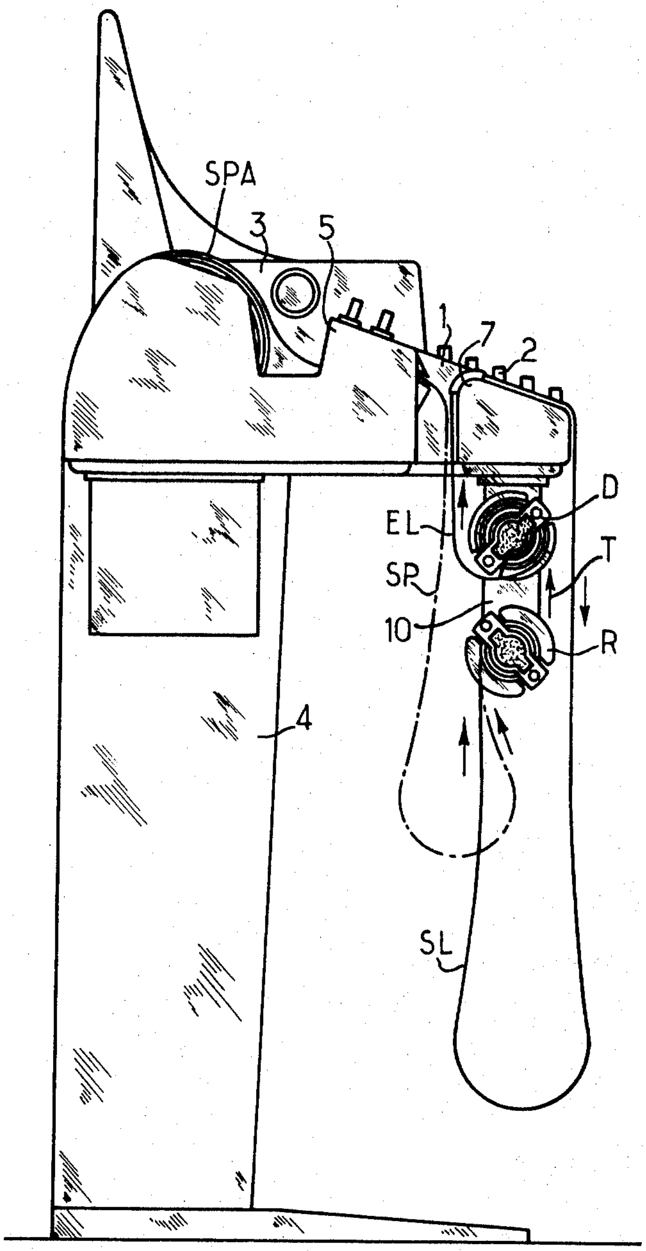
FIG. 1 is a profile view of an embodiment of the invention on a computer terminal.

FIG. 1 shows schematically and in profile a teleprinter with tape reader and punch used as a computer terminal. A certain number of units of this type can be connected remotely to the same computer. The terminal shown in FIG. 1 comprises a console 1 provided with a control keyboard 2 and a printing mechanism 3 mounted on a stand 4. On the side of the machine is disposed a tape punching mechanism 5, which receives an unpunched tape SPA. A tape reader 7 is disposed following the tape punch. Underneath the tape reader is disposed a support plate 10 which is provided with two support axles, such as axle 11 (FIG. 3C) adapted for holding respectively a reel in receiving position R and a reel in supply position D. In FIG. 1, support plate 10 is affixed to the machine in an "advanced" position. In this position the reels are directly within reach of the operator's hand, although to some it may be considered that this position is inconvenient for the legs of an operator seated in front of the machine. In this arrangement, a tape SP emerging from the punch and a tape EL entering into the reader can be simultaneously engaged in the reels in positions R and D, respectively, without crossing.

Figure 2:
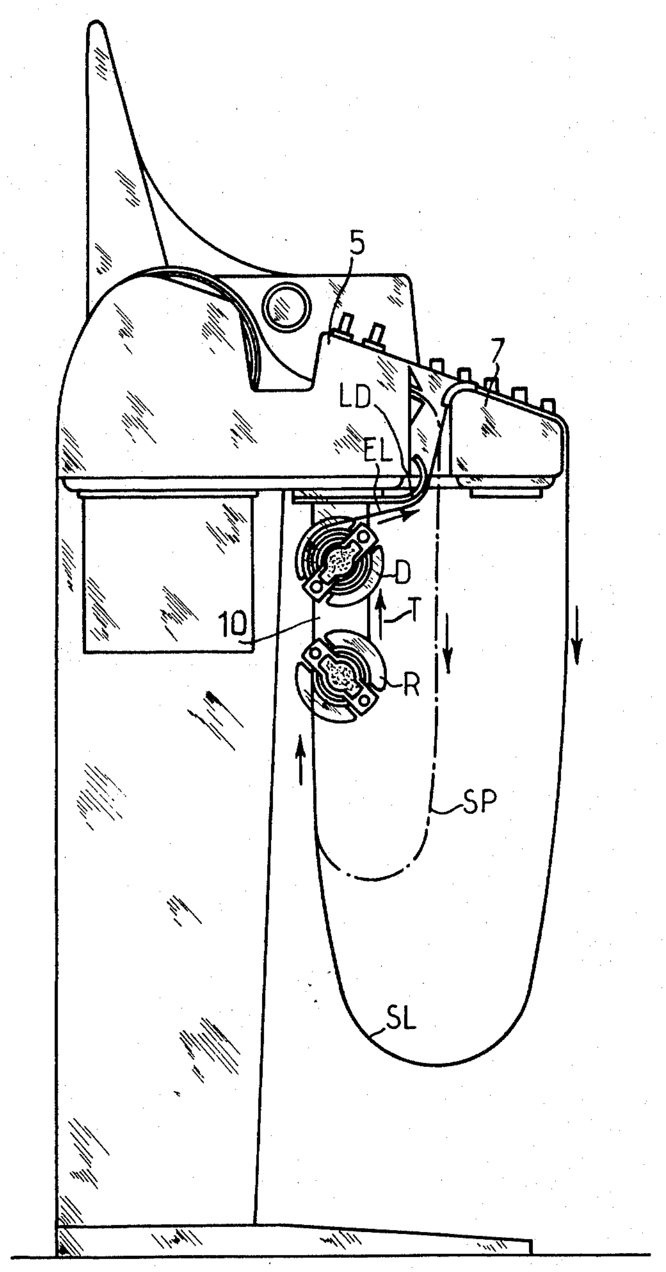
FIG. 2 is a profile view of a variation of FIG. 1.

FIG. 2 shows another arrangement in which support plate 10 is affixed further back for better freeing the legs of the operator, but which requires the operator to bend further forward to reach the reels. A deflector LD, constituted of a flexible thin plate, is disposed to conduct tape EL toward tape reader 7 without its rubbing against the machine. A reel in receiving position R can receive equally well (FIGS. 1 and 2) a tape SP emerging from the tape punch or a tape SL emerging from the reader. In order to pass correctly into the reader, a tape must be "inverted" from previously, i.e., transferred in accordance with arrow T from a reel in position R to a reel in position D. After this the tape (EL) can be engaged in reader 7.

The reels employed for receiving or delivering the tapes can have different forms. Nevertheless, in the preferred embodiment of the invention, the reels are fabricated according to the form indicated by virtue of the example of FIGS. 3A – 6B, or according to forms derived from the same principles. In the embodiment represented in different manners in FIGS. 3A – 5, a reel B comprises a hub 15 provided at one of its extremities with a flange formed of two blades 16 and 17, disposed in the same plane and attached to said hub and mutually spaced apart. At its other extremity, hub 15 is provided with a flange formed of two blades 18 and 19 having a form corresponding substantially to the form of the free space between the blades of the opposed flange. In fact, for reasons which will be explained later, the blades of a flange are slightly narrower than the width of the corresponding openings in the other flange.

Figure 5:
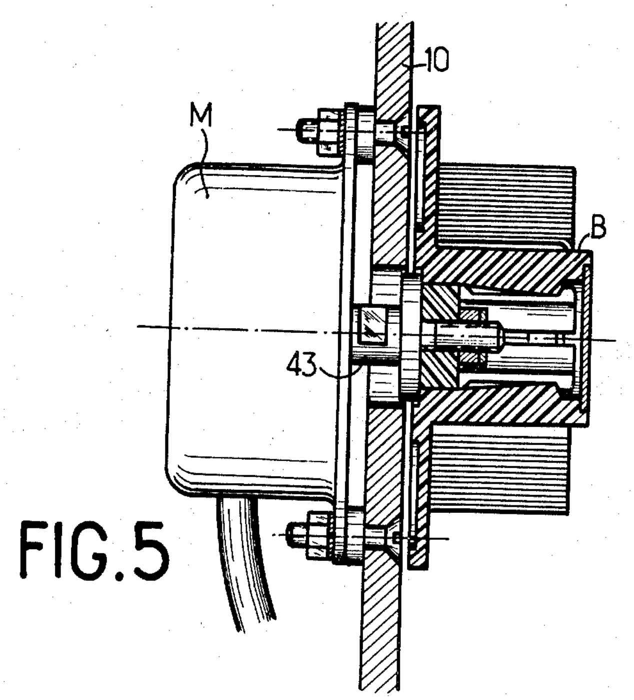
FIG. 5 is an end view of a reel mounted on a support axle coupled to an electric motor.

Blades 16 and 17 are each provided, toward their extremities and on the exterior face of the reel, with cavities 20 and 21 of circular form. These cavities are adapted for receiving either the extremity of a finger or of an object of appropriate form, in lieu of a crank, for rotating the reel in either sense around its axis when it is mounted on a support axle 11 (FIGS. 3C and 5).

The hub of the reel is provided with at least two tape retaining leafs 22 and 23 (FIG. 3B) each providing a slit in which can be engaged one extremity of a tape for winding. The particular leaf selected for use provides that the tape is bent back on such leaf when it is wound on the reel. For facilitating accessibility to these retaining leafs, they are disposed on the hub opposite the openings between the blades providing the driving cavities.

In the different embodiments of the reel which are shown, the retaining leafs are molded as a single piece with the hub and the flange blades of the reel, which permits a considerable reduction in the cost of molding of the reels. The internal face of the blades of each flange may be molded by a part of the mold passing between the blades of the opposite flange. Apertures 24 employed in the reel permit, in known manner, the reduction of the weight of the molded member.

The reel is provided at its center with a hole 25 which is of form adapted for receiving a support axle 11 (FIGS. 3C and 5) of appropriate form. In FIG. 3C, support axle 11 is shown provided with cylindrical bearings 28P and 29P of different diameters, whereas the central hole of the reel is provided with cylindrical parts 28A and 29A bored to diameters corresponding to those of the bearings of the support axle. In the reel, a conical part 30 is provided between parts 28A and 29A. The support axle is fabricated of a material appropriately flexible and resistant to wear by rubbing. Axle 11 is in part apertured in its center and is provided at its extremity with a flare 31 having an external diameter slightly greater than that of bearing 29P. This axle is provided with longitudinal slits 32 adapted to permit the introduction and subsequent extraction of a reel on the axle. At the time of placing the reel on the support axle, the flare 31 thereof is engaged without difficulty in the bore 28A of the reel, and the reel is then pushed onto the axle. Conical part 30 of the reel forces together progressively, one toward the other, the parts 31 of the axle to let it pass into bore 29A, after which, by their elasticity, parts 31 separate from each other and place themselves against a retainer rim 33 of conical form. The reel is thereby retained on the support axle on which it is mounted by friction, to assure a slight drag on it by the axle.

Figure 4:
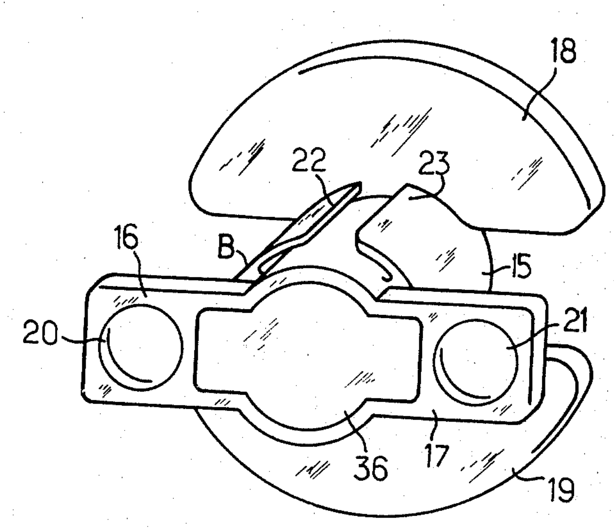
FIG. 4 is a perspective view of the reel of FIGS. 3A, 3B, and 3C.

The reel is provided (FIGS. 3A and 3B) with a groove 35, adapted for receiving a closing plate 36 (FIGS. 3C and 4). Plate 36 is made of a material of light color permitting the writing and erasing (if necessary) of information relative to the tape temporarily wound on such reel.

Figure 6A:
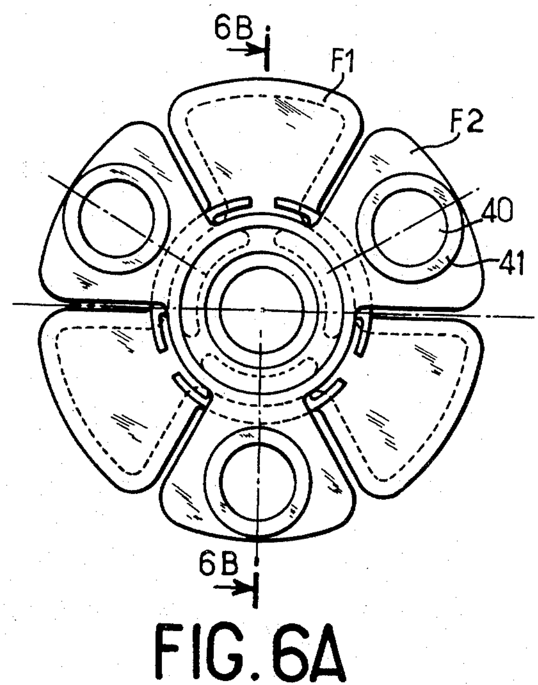
FIGS. 6A and 6B are respectively a plan view and an end view, in section, of another embodiment of the reel.
Figure 6B:
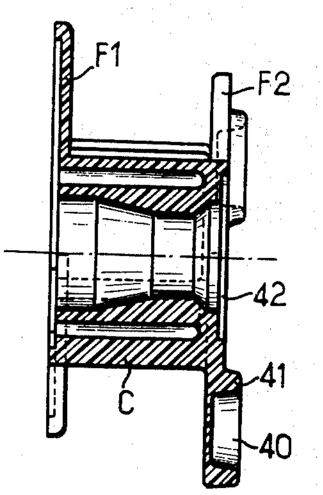

FIGS. 6A and 6B illustrate a reel C, wherein the concept is analogous to that of reel B although the exterior appearance is different. In reel C, the flanges F1 and F2 are each formed of three identical blades. The driving cavities 40 formed in the blades of flange F2 are each provided with a peripheral flare 41 which accentuates the depth and assures the best engagement for the finger in the cavity for the manual driving of the reel. Since three openings are disposed between blades of flange F2, the hub is provided with three pairs of retaining leafs. A notch 42 is provided for receiving a circular closing plate, analogous to plate 36 on reel B.

In an improved form of application of the invention which may be required for the frequent handling of tapes of predetermined length, the support axles of the reels are each mounted on a shaft 43 of a small electric motor M (FIG. 5). These motors are preferentially motors which induce a slow speed and can slip; motors of this type are known. These motors easily endure a "-slipping" in relation to their nominal speed, not offering the high torque resistance of a motor providing a low speed. In this instance, the nominal velocity is chosen as a function of the maximum output of the tape reader and of the tape punch and the minimum diameter of the reel hub. The maximum torque transmitted will be similarly limited in order that the traction exerted on a tape is not able to impair the normal operation of the reader or the punch. The friction of the support axle in the reel can also be utilized as a limitation on the torque.

Figure 7:
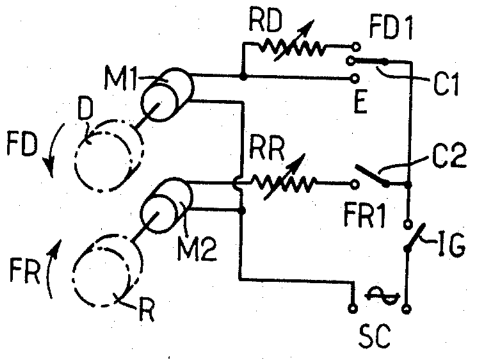
FIG. 7 is a schematic diagram of the principle of the control circuits for reels which are mounted on support axles coupled to electric motors.

In the diagram of FIG. 7, a motor M1 is coupled to the support axle for the supply reel D and tends to drive this axle in the sense of the arrow FD, whereas a motor M2 is provided for driving the support axle of the receiving reel R in the sense of the arrow FR. Motor M1 may be coupled to a source of alternating current SC through a switch C1 and a circuit breaker IG. Switch C1 has three positions and permits, in a neutral position, the cutting off of current only to motor M1. With switch C1 in position FD1, motor M1 is supplied through an adjustable resistor RD which permits regulating the maximum torque furnished by motor M1 to a low value, whereas in position E of switch C1, motor M1 is supplied directly from the current source and furnishes its maximum torque. Switch C2 has only two positions, a neutral position in which motor M2 is turned off, and the position FR1, in which motor M2 is supplied through a resistor RR, which is adjustable for limiting the maximum torque furnished to receiving reel R.

Referring to FIG. 2, the operation of the embodiment represented is as follows. In order to wind on a reel in position R the part SL of a tape emerging from the reader or the part SP of a tape emerging from the punch, switches IG and C2 are closed. Motor M2 is thereupon supplied a low torque and reel R turns until the section SL (or SP) is slightly taut, after which motor M2 "slips."

For entering a tape into the reader, the tape first has to be "inverted," unless such operation has been already accomplished, which can be verified instantly by the sense of the winding of the tape on the reel. For "inverting" a tape, it has to be transferred from a reel in position R to a reel in position D. For this, breaker IG is opened and the free extremity of a tape SL wound on a reel R is engaged on a reel in position D. Switch C1 is then moved to position E (winding), switch C2 is closed, and breaker IG is closed. Under these conditions, the torque furnished by the motor M1 is dominant relative to the torque of motor M2 (acting in the inverse sense), and the tape is tightened and transferred from reel R to reel D in the sense of the arrow T. After the transfer of the tape is completed breaker IG is opened.

After tape SL becomes tape EL it may either remain stored on its reel or enter into the reader for transmission. Two cases may be implemented: either motor M1 is turned off, wherein the braking by the non-excited motor is sufficient for holding tape EL slightly taut, or switch C1 is moved to position FD1, wherein motor M1 is excited through resistor RD and furnished with only a very low torque for resisting the advance of the tape. If switch C2 is closed, tape SL emerging from the reader can be wound automatically on a receiving reel mounted at R.

It is apparent that the examples which have been described in order to illustrate the invention are not limitations and that certain modifications and adaptations can be adduced according to requirements without departing from the heart of the invention.

I claim:

1. A reel for receiving, storing or restitution of a recording tape comprising:

a molded hub adapted for being mounted on a support axis and having a tape receiving surface, said hub having cylindrical parts of unequal diameters and a conical part connecting said cylindrical parts to permit fastening of an axle on said reel, a notch on said hub adapted for receiving a circular closing plate to fasten said reel to said axle, a plurality of retaining leaves integrally molded with said hub and forming a portion of said tape receiving surface, said retaining leaves disposed in pairs, each pair having one leaf provided for retaining the tape on the reel during winding in one direction and another leaf provided for retaining the tape on the reel during winding in the other direction, said one leaf being opposed and in spaced relation to said other leaf, the reel having extremities provided with flanges integrally molded on said hub for guiding said tape on said reel, one of said flanges including a plurality of blades separated by openings and disposed in one plane around one extremity of said hub with said retaining leaves being disposed on said hub opposite the openings provided between the blades of said one flange, a second of said flanges including a plurality of blades separated by openings and disposed in another plane around the other extremity of said hub, each of said blades of said one flange being formed to substantially the shape of the openings in the opposed blades of said second flange, and said each of said blades of said one flange including a driving cavity, said driving cavity being provided with a peripheral flare which is adapted for receiving the extremity of a finger or of an object of appropriate form permitting the driving of said reel in a rotational movement in one sense or the other around its axis.

* * * * *